(12) United States Patent
Kasahara et al.

(10) Patent No.: US 8,118,476 B2
(45) Date of Patent: Feb. 21, 2012

(54) GAS/LIQUID MIXING EQUIPMENT, GAS/LIQUID MIXING METHOD, POLYMER AND METHOD FOR ITS PRODUCTION

(75) Inventors: Nobuyuki Kasahara, Yokohama (JP); Shin Tatematsu, Tokyo (JP); Shigeki Kobayashi, Ichihara (JP); Yasuhiko Matsuoka, Ichihara (JP); Hiroki Nagai, Ichihara (JP); Terence Edwin Attwood, Thornton Cleveleys (GB); Steven McDonald, Thornton Cleveleys (GB); Philip David Mackrell, Thornton Cleveleys (GB); Shigeki Hiraoka, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 1233 days.

(21) Appl. No.: 11/232,007

(22) Filed: Sep. 22, 2005

(65) Prior Publication Data

US 2006/0092763 A1 May 4, 2006

(30) Foreign Application Priority Data

Sep. 28, 2004 (JP) ................................. 2004-282340

(51) Int. Cl.
*B01F 7/08* (2006.01)
(52) U.S. Cl. ........................... 366/99; 366/320; 366/321
(58) Field of Classification Search .................... 366/88, 366/99, 320, 321
See application file for complete search history.

(56) References Cited

U.S. PATENT DOCUMENTS

| | | | | |
|---|---|---|---|---|
| 332,349 | A | * | 12/1885 | Knox ............................ 366/321 |
| 1,500,061 | A | * | 7/1924 | Dimm ........................... 366/196 |
| 1,909,324 | A | * | 5/1933 | Wendler ........................ 366/321 |
| 1,995,540 | A | | 3/1935 | Harrison |
| 3,870,691 | A | | 3/1975 | Grimaud et al. |
| 4,539,112 | A | | 9/1985 | Durot et al. |

FOREIGN PATENT DOCUMENTS

| | | |
|---|---|---|
| CN | 1120466 A | 4/1996 |
| CN | 2636981 Y | 9/2004 |
| EP | 0 271 198 A1 | 6/1988 |
| FR | 2 345 398 | 10/1977 |

(Continued)

OTHER PUBLICATIONS

Koji Ando, et al., Collection of Chemical Engineering Papers (published by Society of Chemical Engineers, Japan), vol. 35, No. 7, 1971, pp. 82-87 and pp. 111-115.
Koji Ando, et al., Collection of Chemical Engineering Papers (published by Society of Chemical Engineers, Japan), vol. 38, No. 7, 1974, pp. 66-68.

*Primary Examiner* — David Sorkin
(74) *Attorney, Agent, or Firm* — Oblon, Spivak, McClelland, Maier & Neustadt, L.L.P.

(57) ABSTRACT

A gas/liquid mixing equipment of the present invention comprises a stirring vessel 1, a stirring shaft 10 inserted horizontally in the stirring vessel 1 and a helical ribbon impeller 20 attached to the stirring shaft 10, whereby a high gas absorption performance can be secured even with low shearing. Further, a polymer can be produced with high productivity. A gas/liquid mixing method of the present invention is a method which comprises employing the above-mentioned gas/liquid mixing equipment, and a method for producing a polymer of the present invention is a method which comprises polymerizing feed monomers containing gaseous monomers in aqueous solvents, wherein the gaseous monomers and the aqueous solvents are mixed by such a gas/liquid mixing method. A polymer of the present invention is produced by the above-mentioned method for producing a polymer.

20 Claims, 2 Drawing Sheets

FOREIGN PATENT DOCUMENTS

| | | |
|---|---|---|
| JP | 45-39829 | 12/1970 |
| JP | 58-43935 | 3/1983 |
| JP | 61-15725 | 1/1986 |
| JP | 1-104330 | 4/1989 |
| JP | 1-152720 | 10/1989 |
| JP | 5-103964 | 4/1993 |
| JP | 10-342 | 1/1998 |
| WO | WO 98/27102 | 6/1998 |
| WO | WO 99/16539 | 4/1999 |
| WO | WO 03/059992 A1 | 7/2003 |

* cited by examiner

GAS/LIQUID MIXING EQUIPMENT, GAS/LIQUID MIXING METHOD, POLYMER AND METHOD FOR ITS PRODUCTION

The present invention relates to a gas/liquid mixing equipment provided with a horizontal stirring vessel, a gas/liquid mixing method, a polymer and a method for its production.

As a gas/liquid mixing equipment, it has been common to use a vertical stirring vessel wherein a stirring shaft is disposed in a vertical direction, and various stirring devices or stirring systems have been proposed. On the other hand, a horizontal stirring vessel wherein a stirring shaft provided with paddle devices is disposed in a horizontal direction, may sometimes be used as a gas/liquid mixing equipment. It is known that as compared with the vertical stirring vessel, the horizontal stirring vessel has a high gas absorption rate and is excellent in the heat removal performance and further capable of stirring and mixing efficiently even in mixing where the liquid surface of the charge changes.

However, as disclosed by Koji Ando et al in Collection of Chemical Engineering Papers (published by society of chemical engineers, Japan), Vol. 35, No. 7, 1971, p. 82-87 and p. 111-115 and by Koji Ando et al in Collection of Chemical Engineering Papers, Vol. 38, No. 7, 1974, p. 66-68, in order to secure a high gas absorption performance by means of a horizontal stirring vessel as a conventional method, it has been necessary to impart a high power to a liquid, or to give high shearing by providing a baffle in some cases, to microsize and disperse gas bubbles. Namely, with a conventional vertical stirring vessel, it has been impossible to obtain a high gas absorption performance with low shearing.

Whereas, depending upon a chemical synthetic reaction or a biochemical reaction, stirring is sometimes required so that a high gas absorption performance can be secured with low shearing. For example, in a emulsion polymerization reaction employing a gaseous monomer, with high shearing, demulsification is likely to result, and agglomerates are likely to be formed to deteriorate the productivity, and accordingly, the reaction is required to be carried out with low shearing. Further, in a reaction involving culturing of bacteria, with high shearing, the bacteria will be physically damaged and killed, and accordingly, the reaction is required to be carried out with low shearing. However, heretofore, a gas/liquid mixing equipment or a gas/liquid mixing method has not been known which is capable of satisfying such a requirement.

It is an object of the present invention to provide a gas/liquid mixing equipment and a gas/liquid mixing method, whereby a high gas absorption performance can be secured even with low shearing. Further, another object is to provide a polymer which can be produced with high productivity and a method for its production.

The present invention provides a gas/liquid mixing equipment comprising a stirring vessel, a stirring shaft inserted horizontally in the stirring vessel and a helical ribbon impeller attached to the stirring shaft.

In the gas/liquid mixing equipment of the present invention, it is preferred that the helical ribbon impeller has from 2 to 6 stirring blades.

Further, in the gas/liquid mixing equipment of the present invention, it is preferred that at least two helical ribbon impellers are attached in the axial direction of the stirring shaft.

In such a case, the equipment is preferably provided with helical ribbon impellers which are different in the winding direction.

Further, the gas/liquid mixing equipment of the present invention is preferably provided with helical ribbon impellers wherein the ratio of the pitch to the impeller diameter in the helical ribbon impellers is from 3 to 20.

The present invention also provides a gas/liquid mixing method which comprises employing the above-described gas/liquid mixing equipment.

The present invention further provides a method for producing a polymer, which comprises polymerizing feed monomers containing gaseous monomers in aqueous solvents, wherein the gaseous monomers and the aqueous solvents are mixed by the above-described gas/liquid mixing method.

In the method for producing a polymer of the present invention, the gaseous monomers may be fluorinated monomers.

The above fluorinated monomers are preferably tetrafluoroethylene.

The present invention further provides a polymer produced by the above-described method for producing a polymer.

The present invention further provides a polytetrafluoroethylene produced by the above-described method.

Further, the present invention provides an aqueous dispersion of a polytetrafluoroethylene produced by the above-described method for producing a polymer.

By the gas/liquid mixing equipment and the gas/liquid mixing method of the present invention, a high gas absorption performance can be secured even with low shearing. Accordingly, by employing the gas/liquid mixing equipment and the gas/liquid mixing method of the present invention, it is possible to suppress breakage or instability, even in a case where a substance which is likely to be broken or unstabilized by shearing, is contained in a liquid.

By the method for producing a polymer of the present invention, the gaseous monomers can be mixed efficiently with aqueous solvents with low shearing, whereby a polymer can be obtained with a high productivity.

The polymer of the present invention is obtained by polymerizing the gaseous monomers efficiently with low shearing, whereby it is obtainable as a polymer of high quality at low costs.

The aqueous dispersion of a polytetrafluoroethylene obtained by the method of the present invention is excellent in the dispersion stability.

Figure 1:
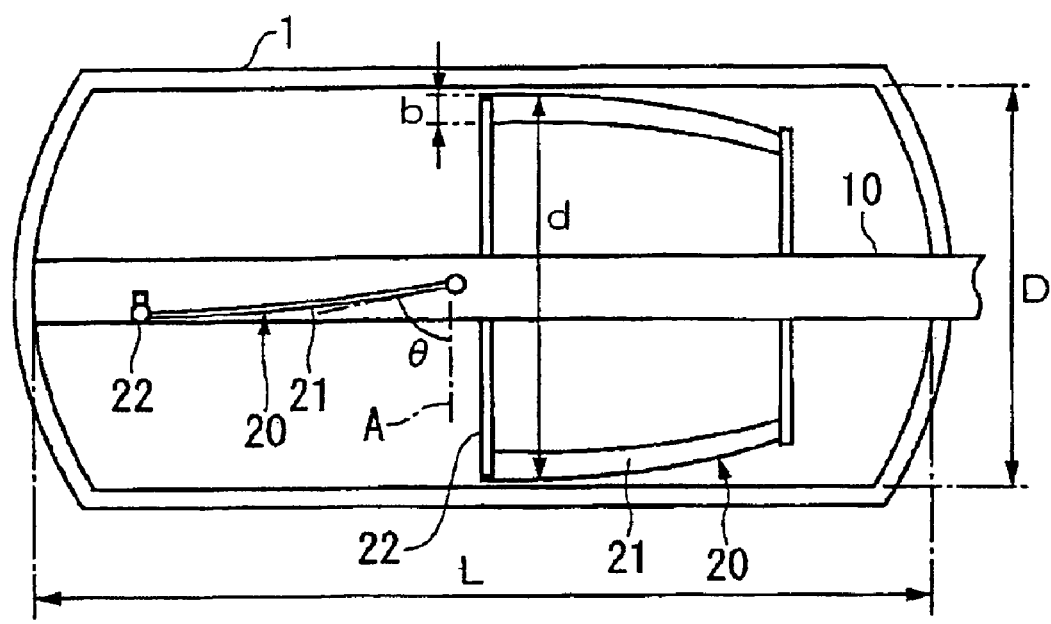
FIG. 1 is a schematic structural view illustrating an embodiment of the gas/liquid mixing equipment of the present invention.

In the drawings, reference numeral 1 designates a stirring vessel, 10 a stirring shaft, 20 a helical ribbon impeller, and 21 a stirring blade.

The gas/liquid mixing equipment of the present invention is a horizontal stirring equipment comprising a stirring vessel 1, a stirring shaft 10 inserted horizontally in the stirring vessel 1 and a helical ribbon impeller 20 attached to the stirring shaft 10, as shown in FIG. 1. A clearance is formed between the helical ribbon impeller 20 and the inner peripheral surface of the stirring vessel 1.

And it is so designed that the lower portion of the helical ribbon impeller 20 will contact a liquid phase, and the upper portion will contact a gas phase.

The helical ribbon impeller 20 is one having a strip-shaped stirring blade 21 made of a metal, is helically attached to the stirring shaft 10 via a supporting rod 22. The number of helical winding formed by the stirring blade 21 is preferably less than 1. The number of stirring blades 21 which one helical ribbon impeller 20 may have, may be one or plural. When plural, they are preferably from 2 to 6, more preferably from 2 to 4, particularly preferably 2, as shown in FIG. 1, whereby shearing can be made lower. Further, when plural, each of stirring blades 21 is preferably disposed at an equal angle.

On the stirring shaft 10, at least two helical ribbon impellers 20 are preferably attached in the axial direction, whereby the gas absorption performance and the mixing performance can be further increased, and more preferably, an even number of helical ribbon impellers are attached.

Further, it is preferred that a plurality of helical ribbon impellers 20 which are different in the winding direction are attached in the axial direction of the stirring shaft. It is particularly preferred that the helical ribbon impellers 20 are disposed so that when rotated in one direction, they will produce discharging currents from the center of the stirring vessel towards both ends. Specifically, it is preferred that the respective stirring blades 21 of each helical ribbon impeller 20 are disposed so that the center side in the stirring vessel 1 is located forward in the rotational direction than both end sides. If the liquid flows from the center towards both ends in the stirring vessel 1, the mixing efficiency will be further increased. Whereas, in a case where a plurality of helical ribbon impellers 20 are all attached in the same winding direction in the axial direction of the stirring shaft, the liquid will continuously be sent to one side of the stirring vessel during the stirring, whereby the liquid surface will be slanted, and the mixing performance may sometimes deteriorate.

Further, the number of helical ribbon impellers 20 in one winding direction is preferably equal to the number of helical ribbon impellers in the opposite winding direction, since it is thereby possible to further increase the mixing efficiency.

In order to further increase the mixing efficiency by letting the liquid flow from the center towards both ends of the stirring vessel 1, it is preferred that the helical ribbon impellers 20 in the same winding direction are continuously disposed, so that they are not alternately disposed with the helical ribbon impellers 20 in the opposite winding direction.

Further, a gate device may be attached between the helical ribbon impellers having different winding directions. Here, the gate impeller is a stirring device wherein stirring blades parallel to the stirring shaft having the surface directed to the rotational direction, are attached to the stirring shaft via supporting rods.

Further, the number of the helical ribbon impellers 20 to be provided, is preferably selected depending upon the L/D ratio i.e. the ratio of the length L to the diameter D of the stirring vessel 1. For example, in the case of a stirring vessel 1 with a L/D being about 2, it is preferred that two helical ribbon impellers 20 are provided.

Further, in a case where a plurality of helical ribbon impellers 20 are attached, it is preferred that they are attached to the stirring shaft 10 so that they are fixed by an angle obtained by dividing 180° by the number of the stirring blades 21, for example, by 90° in the case of two stirring blades 21. When the respective helical ribbon impellers 20 are attached in such a manner, the interval for the stirring blades 21 to pass the gas/liquid interface will be uniform, whereby the mixing efficiency can further be increased. In a case where a plurality of helical ribbon impellers 20 are attached, the skew of the respective helical ribbon impellers 20 may sometimes be referred to as a phase difference.

Figure 2:
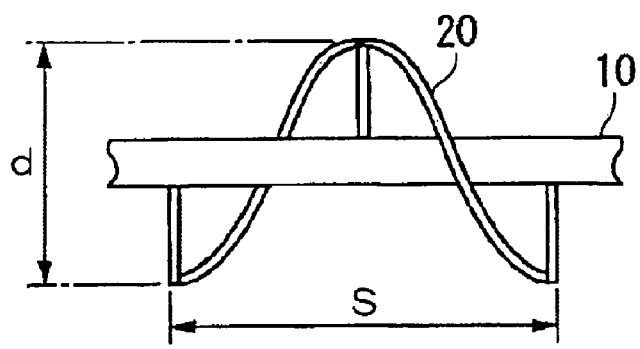
FIG. 2 is a view illustrating the pitch of the helical ribbon impeller.

Further, the gas/liquid mixing equipment is preferably provided with helical ribbon impellers 20 wherein s/d i.e. the ratio of the pitch s to the impeller diameter d in the helical ribbon impellers is from 3 to 20. A more preferred range of s/d i.e. the ratio of the pitch s to the impeller diameter d is from 12 to 15. The pitch s is the length of the helical ribbon impeller 20 in a direction parallel to the stirring shaft 10 when the helical ribbon impeller 20 is wound once around the stirring shaft 10 (see FIG. 2).

Further, in a case where s/d i.e. the ratio of pitch s to the impeller diameter d is 3, the inclination angle θ of the stirring blade of the helical ribbon impeller 20 is 43.6°; in a case where s/d is 20, the inclination angle θ is 81.1°; in a case where s/d is 12, the inclination angle θ is 75.3°; and in a case where s/d is 15, the inclination angle θ is 78.2°. Thus, the inclination angle θ of the helical ribbon impellers 20 is preferably from 43.6° to 81.1°, more preferably from 75.3° to 78.2°. The inclination angle θ is an angle of the stirring blade 21 against plane A perpendicular to the lengthwise direction of the stirring shaft 10 and is an angle smaller than 90° (see FIG. 1).

The ratio (d/D) of the impeller diameter d in the helical ribbon impeller 20 to the diameter D of the stirring vessel is preferably from 0.85 to 0.97. Further, the ratio (b/D) of the blade width b in each helical ribbon impeller 20 to the diameter D of the stirring vessel 1 is preferably from 0.09 to 0.2.

Figure 3:
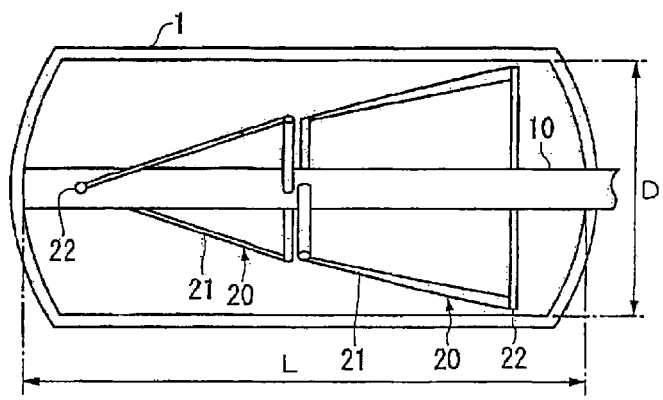
FIG. 3 is a schematic structural view illustrating another embodiment of the gas/liquid mixing equipment of the present invention.

FIG. 3 shows an embodiment wherein the pitch in the helical ribbon impellers is different (an embodiment wherein the pitch is smaller than in the embodiment of FIG. 1). In this embodiment, the construction is the same as in the embodiment of FIG. 1, and the description of the same construction will be omitted by identifying the same components with the same symbols in FIG. 1.

The above-described gas/liquid mixing equipment is a horizontal stirring equipment comprising the stirring vessel 1, the stirring shaft 10 inserted horizontally in the stirring vessel 1 and the helical ribbon impeller 20 attached to the stirring shaft 10, whereby the mixing efficiency is high, and the surface renewal of the liquid can be promoted even with low shearing. Accordingly, even with low shearing, a high gas absorption performance can be secured, and the equipment can be suitably applied, for example, to an emulsion polymerization reaction using gaseous monomers or to a reaction involving culturing of bacteria.

The gas/liquid mixing method of the present invention is a method which comprises employing the above-described gas/liquid mixing equipment. This gas/liquid mixing method can be applied to various gas/liquid mixtures. Especially, since a gas absorption rate can be increased even with low shearing, it can suitably be applied to a polymerization reaction where the gas is monomers and the liquid is solvents, or to culturing where the gas is air and the liquid is a liquid containing bacteria.

In such a gas/liquid mixing method, the impeller Reynolds number is preferably at least 800, more preferably at least 5,000. However, if attention is paid only to the impeller Reynolds number, when the rotational speed exceeds a certain level, the vicinity of the stirring shaft becomes vacant thus leading to an annular flow state where the liquid is localized on the inner peripheral side of the stirring vessel. In such an annular flow state, even if the impeller Reynolds number is within the above range, a high gas absorption rate cannot be obtained. Accordingly, it is important to stir at a stirring rotational speed not to create the annular flow state. The rotational speed to avoid the annular flow state may suitably be selected depending upon the shapes or sizes of the stirring vessel 1 and the helical ribbon impellers 20.

Further, in this gas/liquid mixing method, the liquid charging ratio is preferably from 50 to 90 vol %, when the internal capacity of the stirring vessel is 100 vol %.

Now, the method for producing the polymer of the present invention will be described.

The method for producing a polymer of the present invention is a method which comprises polymerizing feed monomers containing gaseous monomers in aqueous solvents, wherein the gaseous monomers and the aqueous solvents are mixed by the above-described gas/liquid mixing method. The aqueous solvents of this method are meant for water, or water having a small amount of an organic solvent added thereto. Specific examples of the gaseous monomers contained in the feed monomers include fluorinated monomers such as tetrafluoroethylene (hereinafter referred to as TFE), hexafluoropropylene, vinylidene fluoride, chlorotrifluoroethylene, vinyl fluoride, trifluoroethylene, 1,2-difluoroethylene, trifluoropropylene and 3,3,3-trifluoropropylene, and ethylene, propylene, and vinyl chloride. As the fluorinated monomer, TFE is more preferred.

A fluorinated monomer has a high polymerization rate, whereby it is especially desired that the gas absorption to the aqueous solvents is quick. Thus, the method for producing a polymer of the present invention which is excellent in the gas absorption performance, will provide a remarkable effect at the time of polymerizing gaseous fluorinated monomers. The feed monomers may contain liquid monomers. When the gaseous monomers are fluorinated monomers, the liquid monomers are also preferably fluorinated monomers. The liquid fluorinated monomers include, for example, a fluoroolefin such as 2-trifluoromethyl-3,3,3-trifluoro-1-propene or (perfluorobutyl)ethylene, a perfluoro(alkyl vinyl ether) such as perfluoro(methyl vinyl ether), perfluoro(ethyl vinyl ether) or perfluoro(propyl vinyl ether), a perfluoro(alkenyl vinyl ether) such as perfluro(1,3-dioxole) or perfluoro(butenyl vinyl ether), an etheric oxygen atom-containing cyclic perfluoroolefin such as perfluoro(2,2-dimethyl-1,3-dioxole) or perfluoro(2-methylene-4-methyl-1,3-dioxolane), a (perfluoroalkyl)ethyl acrylate such as (perfluorobutyl)ethyl acrylate, (perfluorohexyl)ethyl acrylate, (perfluoroheptyl)methyl acrylate, or (perfluorooctyl)ethyl acrylate, a (perfluoroalkyl)ethyl methacrylate such as (perfluorobutyl)ethyl methacrylate, (perfluorohexyl)ethyl methacrylate, (perfluoroheptyl) methyl methacrylate, or (perfluorooctyl)ethyl methacrylate, and a fluorostyrene such as α-fluorostyrene, β-fluorostyrene, α,β-difluorostyrene, β,β-difluorostyrene, α, β,β-trifluorostyrene, α-trifluoromethylstyrene, 2,4,6-tri(trifluoromethyl)styrene, 2,3,4,5,6-pentafluorostyrene, perfluoro(styrene), or 2,3,4,5,6-pentafluoro-α-methylstyrene.

The fluorinated monomers may have functional groups as shown in the formula (1).

$$CX_2=CY\text{-}Rf\text{-}Z \tag{1}$$

In the formula (1), Z is $CH_2OH$, COOH, COOR (wherein R is a $C_{1-10}$ alkyl group which may contain an etheric oxygen atom), $SO_2F$, $CH_2OCN$, $CH_2PO_3H$, and each of X and Y which are independent from each other, is a hydrogen atom or a fluorine atom, and Rf is a $C_{1-20}$ polyfluoroalkylene group which may contain an etheric oxygen atom.

When the above fluorinate monomers are to be polymerized, polymerization may be homopolymerization employing one type of a fluorinated monomer as the feed monomer or copolymerization employing at least two types of fluorinated monomers, or it may be copolymerization employing a fluorinated monomer and a hydrocarbon monomer.

Polymers to be produced by the method of the present invention include fluoro resins and fluoro rubbers, such as a polytetrofluoroethylene (PTFE), a polyvinylidene fluoride, a polychlorotrifluoroethylene (PCTFE), a polyvinyl fluoride, a polyperfluoro(butenyl vinyl ether), a TFE/hexafluoropropylene copolymer (HFP), a TFE/perfluoro(propyl vinyl ether) copolymer (PFA), a TFE/ethylene copolymer (ETFE), a TFE/vinylidene fluoride/hexafluoropropylene copolymer (THV), a TFE/perfluoro(methyl vinyl ether) copolymer, a TFE/propylene copolymer, and a vinylidene fluoride/hexafluoropropylene copolymer.

Among the above polymers, PTFE is particularly preferred. PTFE is preferably not only a homopolymer of TFE but also a modified PTFE having substantially no processability, which is copolymerized with a very small amount of a comonomer, such as a halogenated ethylene such as chlorotrifluoroethylene, a halogenated propylene such as hexafluoropropylene, or a fluorovinyl ether such as a perfluoro(alkyl vinyl ether).

The polymer obtainable by the method of the present invention, is obtained in the form of an aqueous dispersion wherein the polymer is dispersed in a fine particulated state in an aqueous solvent. Such an aqueous dispersion is excellent in the dispersion stability.

As a polymerization method, emulsion polymerization or suspension polymerization may be employed, and emulsion polymerization is particularly preferred. In a case where fluorinated monomers are to be polymerized by emulsion polymerization, a fluorinated emulsifier is preferably employed as the emulsifier. The fluorinated emulsifier may, for example, be an alkali metal salt such as a lithium salt, a sodium salt or a potassium salt, or an ammonium salt, of a $C_{5-13}$ perfluoroalkanoic acid, ω-hydroperfluoroalknoic acid, ω-chloroperfluoroalkanoic acid or perfluoroalkane sulfonic acid. The fluorinated emulsifier may have a straight chain structure or a branched structure, or may be a mixture thereof. Further, it may contain an etheric oxygen atom in its molecule. Among fluorinated emulsifiers, an ammonium salt is more preferred.

Specific examples of the above acids include perfluoropentanoic acid, perfluorohexanoic acid, perfluoroheptanoic acid, perfluorooctanoic acid, perfluorononanoic acid, perfluorodecanoic acid, perfluorododecanoic acid, ω-hydroperfluoroheptanoic acid, ω-hydroperfluorooctanoic acid, ω-hydroperfluorononanoic acid, ω-chloroperfluoroheptanoic acid, ω-chloroperfluorooctanoic acid, ω-chloroperfluorononanoic acid, $CF_3CF_2CF_2OCF(CF_3)COOH$, $CF_3CF_2CF_2OCF(CF_3)CF_2OCF(CF_3)COOH$, $CF_3CF_2CF_2O[CF(CF_3)CF_2O]_2CF(CF_3)COOH$, $CF_3CF_2CF_2O[CF(CF_3)CF_2O]_3CF(CF_3)COOH$, $CF_3CF_2CF_2CF_2CF_2OCF(CF_3)COOH$, perfluorohexane sulfonic acid, perfluoroheptane sulfonic acid, perfluorooctane sulfonic acid, perfluorononane sulfonic acid and perfluorodecane sulfonic acid.

As a polymerization initiator to be used for the polymerization, a radical polymerization initiator is used. The radical polymerization initiator is preferably one having a decomposition temperature of 10 hours half life to be from 0 to 100° C., more preferably one having a decomposition temperature to be from 20 to 90° C. Specific examples include an azo compound such as azobisisobutyronitrile, a non-fluorine type diacyl peroxide such as disuccinic peroxide, isobutyryl peroxide, octanoyl peroxide, benzoyl peroxide or lauroyl peroxide, a peroxy dicarbonate such as diisopropyl peroxy dicarbonate, a peroxy ester such as tert-butylperoxy pivalate, tert-butyl peroxy butylate or tert-butyl peroxyacetate, a fluorinated diacyl peroxide such as a compound represented by $(Z(CF_2)_pCOO)_2$ (wherein Z is a hydrogen atom, a fluorine atom or a chlorine atom, and p is an integer of from 1 to 10), and an inorganic peroxide such as potassium persulfate, sodium persulfate or ammonium persulfate.

The radical polymerization initiator is used preferably in an amount of from 0.001 to 10 parts by mass, more preferably from 0.01 to 1 part by mass, per 100 parts by mass of the fluorinated monomer.

In the polymerization, a chain transfer agent may be employed. The chain transfer agent may, for example, be an alcohol such as methanol, a chlorofluorohydrocarbon such as 1,3-dichloro-1,1,2,2,3-pentafluoropropane or 1,1-dichloro-1-fluoroethane, or a hydrocarbon such as pentane, hexane, or cyclohexane.

The polymerization conditions are not particularly limited, and the polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

In the method for producing a polymer of the present invention, the gaseous monomers and the aqueous solvents are mixed by the above-described gas/liquid mixing method, whereby the gaseous monomers can be absorbed in the aqueous solvents with low shearing. As a result, the polymerization stability is excellent, and it is possible to prevent agglomeration of the polymer to be produced, whereby the productivity will be high. Especially in the case of emulsion polymerization, demulsification of the latex can be prevented, and the effects will be particularly remarkable.

Now, the present invention will be described in further detail with reference to Examples. However, it should be understood that the present invention is by no means restricted to such specific Examples.

TEST EXAMPLE 1

Measurement of Gas Absorption Performance

Into a gas/liquid mixing equipment provided with impellers shown in Table 1 and having a dissolved oxygen meter installed at the center bottom portion (stirring vessel: a 51.5 L horizontal stirring vessel made of an acrylic resin, D=0.3 m, L=0.685 m), 26 L of deionized water was charged (charging ratio: 50 vol %), and nitrogen gas was circulated to sufficiently carry out gas substitution, while the impellers were rotated. Then, after confirming that the dissolved oxygen meter (manufactured by TOA) indicated 0, circulation of the nitrogen gas was stopped, and a valve was opened to let air flow into the stirring vessel. At the same time, the time was measured, and the dissolved oxygen amount against the passage of time, was recorded. Using the recorded time and the dissolved oxygen amount, the liquid phase volumetric overall mass transfer coefficient KLa was calculated from the formula $dC/dt = KLa(C^* - C)$. The results are shown in Table 1. The larger the value of KLa, the higher the gas absorption performance.

In Table 1, helical ribbon impeller-1 represents an example of employing a gas/liquid mixing equipment wherein helical ribbon impellers 20 are attached to a stirring shaft 10, and winding directions of the respective helical ribbon impellers 20 are different, wherein each helical ribbon impeller 20 has two stirring blades 21, and s/d i.e. the ratio of the pitch s to the impeller diameter d is 6.76 (inclination angle: 65°). In this example, the impeller diameter d of the helical ribbon impeller 20 is 0.29 m, and the blade width b is 0.030 m. Further, the phase difference between the two helical ribbon impellers 20, 20 is 90°.

Helical ribbon impeller-2 represents an example employing a gas/liquid mixing equipment wherein two helical ribbon impellers 20 are attached to a stirring shaft 10 and winding directions of respective helical ribbon impellers 20 are different, wherein each helical ribbon impeller 20 has two stirring blades 21, and s/d i.e. the ratio of the pitch s to the impeller diameter d is 13.5 (inclination angle: 76.9°). In this example, the impeller diameter d of the helical ribbon impeller 20 is 0.29 m, and the blade width b is 0.030 m. Further, the phase difference between the two helical ribbon impeller 20, 20 is 90°.

Helical ribbon impeller-3 represents an example employing a gas/liquid mixing equipment wherein two helical ribbon impellers 20 are attached to a stirring shaft, and winding directions of the respective helical ribbon impellers 20 are different, wherein each helical ribbon impeller 20 has three stirring blades, and s/d i.e. the ratio of the pitch s to the stirring blade diameter b is 13.5 (inclination angle: 76.9°). In this example, the impeller diameter d of the helical ribbon impeller is 0.29 m, and the blade width b is 0.030 m. Further, the phase difference between the two helical ribbon impellers is 60°.

Helical ribbon impeller-4 represents an example employing a gas/liquid mixing equipment wherein two helical ribbon impellers 20 are attached to a stirring shaft, and winding directions of the respective helical ribbon impellers 20 are different, wherein each helical ribbon impeller 20 has four stirring blades, and s/d i.e. the ratio of the pitch s to the impeller diameter d is 13.5 (inclination angle: 76.9°). In this example, the impeller diameter d of the helical ribbon impeller 20 is 0.29 m, and the blade width b is 0.030 m. Further, the phase difference between the two helical ribbon impellers is 45°.

Figure 4:
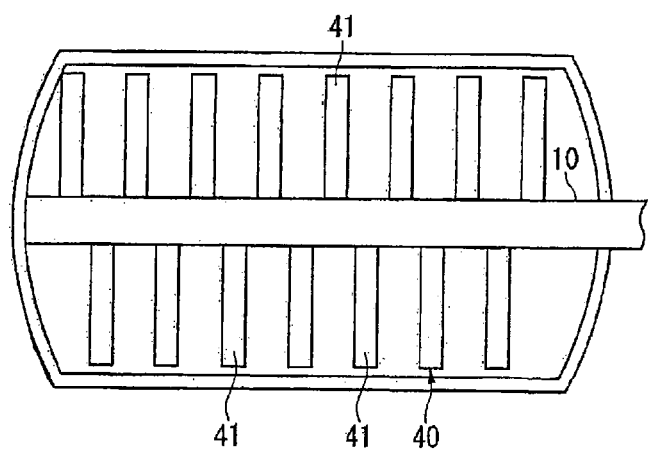
FIG. 4 is schematic structural view illustrating an embodiment of a conventional gas/liquid mixing equipment.

Further, the paddle impeller represents an example employing a gas/liquid mixing equipment having a paddle impeller. The paddle impeller 40 is one wherein 15 stirring blades 41 with surfaces directed to a rotational direction, are installed with a phase difference of 180° from one another on a stirring shaft 10 (see FIG. 4).

The gate device represents an example employing a gas/liquid mixing equipment having a gate impeller. The gate impeller is one wherein four stirring blades, which are parallel to a stirring shaft and have surfaces directed to a rotational direction, are attached to the stirring shaft via supporting rods.

TABLE 1

| Impellers | Rotational speed (rpm) | Volumetric mass transfer coefficient (1/s) |
|---|---|---|
| Paddle impeller | 100 | 0.0007 |
|  | 150 | 0.0006 |
| Gate impeller | 80 | — |
|  | 90 | 0.0026 |
|  | 100 | 0.0024 |
| Helical ribbon impeller -1 | 80 | 0.0038 |
|  | 90 | 0.0031 |
|  | 100 | 0.0023 |
| Helical ribbon impeller -2 | 80 | 0.0026 |
|  | 90 | 0.0034 |
|  | 100 | 0.002 |
| Helical ribbon impeller -3 | 80 | 0.0045 |
|  | 90 | 0.0056 |
|  | 100 | 0.0048 |
| Helical ribbon impeller -4 | 80 | 0.0044 |
|  | 90 | 0.0049 |
|  | 100 | 0.0038 |

TEST EXAMPLE 2

Measurement of Shearing

It is difficult to directly measure the shearing force of the impeller within the stirring vessel. Therefore, shearing of the impeller was evaluated by utilizing a fact that the oil droplet diameter after an oil was added and stirred in water, depends on shearing.

Specifically, 18.7 L of deionized water and 7.3 L of fluorinated solvent $C_6F_{13}H$ were added to the stirring vessel of the gas/liquid mixing equipment shown in Table 1(charging ratio: 50 vol %). Then, after stirring at a prescribed rotational speed for one minute, the stirring was stopped. At the same time, measurement of the time was started, and the time until liquid droplets got unified and disappeared, was measured. The results are shown in Table 2. The larger the shearing, the smaller the liquid droplet diameter, and consequently, the longer the time until the liquid droplets disappear. The smaller the shearing, the larger the liquid droplet diameter, and consequently, the shorter the time until the liquid droplets disappear.

TABLE 2

| Impellers | Rotational speed (rpm) | Time until liquid droplets disappear (seconds) |
| --- | --- | --- |
| Paddle impeller | 100 | 30 |
|  | 150 | 62 |
| Gate impeller | 90 | 49 |
|  | 100 | 55 |
| Helical ribbon impeller -1 | 80 | 33 |
|  | 90 | — |
|  | 100 | 42 |
| Helical ribbon impeller -2 | 80 | 30 |
|  | 90 | — |
|  | 100 | 40 |
| Helical ribbon impeller -3 | 80 | 63 |
|  | 90 | — |
|  | 100 | 83 |
| Helical ribbon impeller -4 | 80 | 69 |
|  | 90 | — |
|  | 100 | 80 |

TEST EXAMPLE 3

Measurement of Mixing Time

The mixing time was measured by an iodo-hypo method. The iodine solution to be used for the iodo-hypo method was prepared by adding 80 g of iodine and 100 g of potassium iodide to 100 g of deionized water. The hypo solution for decolorizing was prepared by dissolving 41.2 g of sodium thiosulfate in 58.8 g of deionized water.

Then, into an stirring vessel of a gas/liquid mixing equipment as identified in Table 1, 26 L of deionized water was charged, and after initiating stirring at a prescribed rotational speed, 40 g of the iodine solution was injected to color the deionized water. After injecting the iodide solution, stirring was continued for 5 minutes, and after confirming sufficient mixing, the hypo solution was injected in an amount of 1.2 times by equivalent to iodine. At the same time as the injection, measurement of the time was started, and the time until of the color of iodine completely disappeared and the liquid became transparent, was measured, and such a time was taken as the mixing time. The results are shown in Table 3.

TABLE 3

| Impellers | Rotational speed (rpm) | Mixing time (seconds) |
| --- | --- | --- |
| Paddle impeller | 100 | 14 |
|  | 150 | 16 |
| Gate impeller | 90 | — |
|  | 100 | 26.5 |
| Helical ribbon impeller -1 | 80 | 7 |
|  | 90 | — |
|  | 100 | 5 |
| Helical ribbon impeller -2 | 80 | 70 |
|  | 90 | — |
|  | 100 | 7 |
| Helical ribbon impeller -3 | 80 | 20 |
|  | 90 | — |
|  | 100 | 20 |
| Helical ribbon impeller -4 | 80 | 13 |
|  | 100 | 12 |

If the respective results are compared at the same rotational speed, as compared with a case where the paddle impeller or the gate impeller was used, in a case where the helical ribbon impeller was employed, the gas absorptive performance was high in spite of low shearing. Yet, in the case where the helical ribbon impeller was used, the mixing time was also short.

Further, if comparison is made among the helical ribbon impeller-1 to 4, the gas absorption performance was high in the case of helical ribbon impeller-3 and -4 where the number of stirring blades was three or four, but in these case, shearing was large, and the mixing time was long. Thus, in the case of helical ribbon impeller 1 and 2 wherein the stirring blades were two, a high gas absorption was secured with low shearing. At 100 rpm of the helical ribbon impeller-2, the gas absorption performance was low, which was attributable to formation of an annular flow.

EXAMPLE 1

A gas/liquid mixing equipment 2 having two helical ribbon impellers 20, 20 installed in a stirring vessel 1 having a internal capacity of 51.5 L (D=0.3 m, L=0.685 m), was prepared (see FIG. 3). The ratio (d/D) of the impeller diameter d (d=0.29 m) to the stirring vessel diameter D in the gas/liquid mixing equipment 2, was 0.97, and the ratio (b/D) of the stirring blade width b (b=0.030 m) to the stirring vessel diameter D, was 0.10. Further, the ratio (s/D) of the pitch s to the impeller diameter d in each helical ribbon impeller 20 was 6.7.

Then, into the stirring vessel 1, 300 g of paraffin wax, 26.0 L of ultrapure water having an electric conductivity of 0.08 μS/cm and 14.91 g of ammonium perfluorooctanoate (hereinafter referred to as APFO) were charged. The stirring vessel 1 was deaerated and purged with nitrogen, and then the impellers were rotated at 90 rpm, and the temperature was raised to 73° C. The impeller Reynolds number at that time was 18,800. After the temperature was stabilized, tetrafluoroethylene (hereinafter referred to as TFE) as a gaseous monomer was introduced to a pressure of 1.86 MPa. Then, while the content in the stirring vessel 1 was stirred, 3.5 g of disuccinic peroxide was added as dissolved in 500 mL of water. After the addition of disuccinic peroxide, the internal pressure dropped to 1.75 MPa in about 4 minutes. There, TFE was continuously supplied to maintain the internal pressure of the autoclave at 1.85 MPa, and polymerization was proceeded. When the amount of TFE supplied from the initiation of the polymerization reached 3,250 g, 29.9 g of APFO as a fluorinated emulsifier was added as dissolved in 500 mL of water. And, when the amount of TFE supplied after initiation of the polymerization reached 16,340 g, the stirring and supply of TFE were stopped, and TFE in the stirring vessel was purged and substituted by hydrogen to obtain a polytetrafluoroethylene (PTFE) emulsified dispersion. The time required for this polymerization was 180 minutes.

Then, the obtained emulsified dispersion was cooled, and the supernatant paraffin wax was removed. The concentration of the emulsified dispersion was about 37.2 mass %, and the average primary particle size was 0.212 µm.

Then, the emulsified dispersion was diluted with pure water to a concentration of 12 mass %, and the diluted emulsified dispersion was adjusted to 30° C. and stirred to obtain a wet powder. Then, the wet powder was dried at 210° C. to obtain a PTFE powder. The obtained powder had a standard specific gravity SSG of 2.167. Further, the separation time indicating the dispersion stability of the emulsified dispersion was 7 minutes.

The average primary particle size was measured in accordance with the specification of U.S. Pat. No. 4,036,802.

SSG was measured in accordance with ASTM-4895.

Further, the separation time indicating the dispersion stability was measured by the following method. A stirring container was prepared which comprises a 5 L round bottomed flask, a 3-inch anchor impeller and two baffles of B24/29 sizes, and the anchor impeller was positioned 1 cm above the bottom of the 5 L round bottomed flask. Then, 3,750 mL of the 10 mass % emulsified dispersion was charged, and the temperature was adjusted to 25° C. Then, the impeller was rotated at a rotational speed of 600 rpm, and at the same time as the initiation of the rotation, measurement of the time by a stop watch was initiated. And, the time (separation time) until the emulsified dispersion was completely separated into water and PTFE, was measured. The separation time indicated the stability of the emulsified dispersion, and the longer the time, the higher the stability.

EXAMPLE 2

A PTFE emulsified dispersion was obtained in the same manner as in Example 1 except that a gas/liquid mixing equipment provided with two helical ribbon impellers 20 with s/d being 13.5 (see FIG. 1) was employed. The time required for the polymerization of TFE was 180 minutes.

Then, the obtained emulsified dispersion was cooled, and the supernatant paraffin wax was removed. The concentration of the emulsified dispersion was about 37 mass % and the primary particle size was 0.220 µm.

Then, in the same manner as in Example 1, a PTFE powder was obtained. The obtained powder had a standard specific gravity (SSG) of 2.160. Further, the separation time of the emulsified dispersion was 8 minutes and 5 seconds.

EXAMPLE 3

A PTFE emulsified dispersion was obtained in the same manner as in Example 1 except that the stirring and supply of TFE were stopped when the amount of TFE supplied reached 19,900 g. The time required for this polymerization was 260 minutes.

Then, the obtained emulsified dispersion was cooled, and the supernatant paraffin wax was removed. The concentration of the emulsified dispersion was about 42.6 mass %, and the average primary particle size was 0.241 µm.

Then, in the same manner as in Example 1, a PTFE powder was obtained. The obtained powder had a standard specific gravity (SSG) of 2.157. Further, the separation time of the emulsified dispersion was 5 minutes and 35 seconds.

EXAMPLE 4

A PTFE emulsified dispersion was obtained in the same manner as in Example 2 except that the stirring and supply of TFE were stopped when the amount of TFE supplied reached 19,900 g. The time required for the polymerization of TFE was 206 minutes.

Then, the obtained emulsified dispersion was cooled, and the supernatant paraffin wax was removed. The concentration of the emulsified dispersion was about 41.1 mass %, and the average primary particle size was 0.256 µm.

Then, in the same manner as in Example 1, a PTFE powder was obtained. The obtained powder had a standard specific gravity (SSG) of 2.151. Further, the separation time of the emulsified dispersion was 3 minutes and 45 seconds.

COMPARATIVE EXAMPLE 1

In a horizontal autoclave (stirring vessel) made of stainless steel and having an internal capacity of 51.5 L (D=0.3 m, L=0.685 m), 15 paddle impellers (see FIG. 4) were installed as impellers. And, a PTFE emulsified dispersion was obtained in the same manner as in Example 1 except that such a stirring vessel was used, and the impellers were rotated at 150 rpm (impeller Reynolds number: 23,500). The time required for the polymerization for the TFE was 259 minutes.

Then, the obtained emulsified dispersion was cooled, and the supernatant paraffin wax was removed. The concentration of the emulsified dispersion was about 35.9 mass %, and the average primary particle size was 0.219 µm.

Then, in the same manner as in Example 1, a PTFE powder was obtained. The obtained powder had a standard specific gravity (SSG) of 2.159. Further, the separation time of the emulsified dispersion was 5 minutes.

COMPARATIVE EXAMPLE 2

A PTFE emulsified dispersion was obtained in the same manner as in Comparative Example 1 except that the stirring and supply of TFE were stopped when the amount of TFE supplied reached 19,900 g. The time required for the polymerization of TFE was 175 minutes.

Then, the obtained emulsified dispersion was cooled, and the supernatant paraffin wax was removed. The concentration of the emulsified dispersion was about 40.4 mass %, and the average primary particle size was 0.258 µm.

Then, in the same manner as in Example 1, a PTFE powder was obtained. The obtained powder had a standard specific gravity (SSG) of 2.155. Further, the separation time of the emulsified dispersion was 2 minutes and 15 seconds.

The results of Examples and Comparative Examples are shown in Table 4.

TABLE 4

|  | Ex. 1 | Ex. 2 | Ex. 3 | Ex. 4 | Comp. Ex. 1 | Comp. Ex. 2 |
|---|---|---|---|---|---|---|
|  | Impellers | | | | | |
|  | Helical ribbon impellers | | | | Paddle impellers | |
| S/d | 6.7 | 13.5 | 6.7 | 13.5 | — | — |
| Rotational speed (rpm) | 90 | | | | 150 | 150 |
| Amount of TFE supplied (g) | 16,340 | | 19,900 | | 16,340 | 19,990 |
| Solid content concentration (mass %) | 37.2 | 37.0 | 42.6 | 41.1 | 35.9 | 40.7 |

TABLE 4-continued

|  | Ex. 1 | Ex. 2 | Ex. 3 | Ex. 4 | Comp. Ex. 1 | Comp. Ex. 2 |
|---|---|---|---|---|---|---|
|  | | | Impellers | | | |
|  | Helical ribbon impellers | | | | Paddle impellers | |
| Average primary particle size (nm) | 0.212 | 0.220 | 0.241 | 0.256 | 0.219 | 0.258 |
| Standard specific gravity of PTFE | 2.167 | 2.160 | 2.157 | 2.151 | 2.159 | 2.155 |
| Separation time | 7 min | 8 min 5 sec | 5 min 35 sec | 3 min 45 sec | 5 min | 2 min 15 sec |

In Examples 1 to 4 wherein helical ribbon impellers were employed, shearing during the polymerization was low, whereby the separation time was long, and the emulsion stability was high. Further, when comparison was made among Examples 1 to 4, in Examples 1 and 2 where the amount of TFE supplied was small, the separation time was longer, and the emulsion stability was higher than in Examples 3 and 4. Further, when the solid content concentration was about 37 mass %, in Example 2 where the pitch was large, the emulsion stability was higher than in Example 1, and when the solid concentration was about 42 mass %, in Example 3 where the pitch was small, the emulsion stability was higher than in Example 4.

On the other hand, in Comparative Examples 1 and 2 wherein paddle impellers were employed, shearing during the polymerization was high, whereby the separation time was short, and the emulsion stability was low.

With respect to the powder properties of the PTFE powders, no significant difference was observed between Examples 1 to 4 and Comparative Examples 1 to 2.

The entire disclosure of Japanese Patent Application No. 2004-282340 filed on Sep. 28, 2004 including specification, claims, drawings and summary is incorporated herein by reference in its entirety.

What is claimed is:

1. A gas/liquid mixing equipment comprising a stirring vessel, a stirring shaft inserted horizontally in the stirring vessel and a helical ribbon impeller attached to the stirring shaft, and having stirring blades, wherein a first helical ribbon impeller is opposite a second helical ribbon impeller on the stirring shaft and the first and second helical ribbon impellers function to effect flow to opposite ends of the stirring vessel from the center of the vessel when the stirring shaft is rotated, and
   wherein the first and second helical ribbon impellers have opposite winding directions, and
   wherein the stirring blades have an outer lengthwise edge and an inner lengthwise edge and the inner lengthwise edge is not in contact with the stirring shaft.

2. The gas/liquid mixing equipment according to claim 1, wherein the helical ribbon impeller has from 2 to 6 stirring blades.

3. The gas/liquid mixing equipment according to claim 1, wherein at least two helical ribbon impellers are attached in the axial direction of the stirring shaft.

4. A gas/liquid mixing method, comprising:
   mixing a liquid and a gas with the gas/liquid mixing equipment of claim 1.

5. A method for producing a polymer, which comprises polymerizing one or more monomers containing gaseous monomers in an aqueous solvent,
   wherein the gaseous monomers and the aqueous solvent are mixed according to the gas/liquid mixing method of claim 4.

6. The method for producing a polymer according to claim 5, wherein the gaseous monomers are fluorinated monomers.

7. The method for producing a polymer according to claim 6, wherein the fluorinated monomers are tetrafluoroethylene.

8. The method for producing a polymer of claim 5, wherein the polymerizing includes continuously supplying the monomers to the gas/liquid mixing equipment.

9. The gas/liquid mixing equipment according to claim 1, wherein an inclination angle of the stirring blade against a plane perpendicular to the lengthwise direction of the stirring shaft is from 75.3° to 78.2°.

10. The gas/liquid mixing equipment according to claim 1, wherein the ratio of the blade width b in each helical ribbon impeller to the diameter D of the stirring vessel is from 0.09 to 0.2.

11. The gas/liquid mixing equipment of claim 1, wherein the first and second helical ribbon impellers are the only helical ribbon impellers on the stirring shaft.

12. The gas/liquid mixing equipment of claim 1, wherein the ratio (d/D) of the impeller diameter d in the helical ribbon impeller to the diameter D of the stirring vessel is from 0.85 to 0.97 and the ratio (b/D) of the blade width b in each helical ribbon impeller to the diameter D of the stirring vessel is from 0.09 to 0.2.

13. The gas/liquid mixing equipment according to claim 1, wherein a ratio of a pitch to a stirring blade diameter in at least one helical ribbon impeller is from 3 to 20.

14. A gas/liquid mixing equipment comprising
   a stirring vessel, a stirring shaft inserted horizontally in the stirring vessel, first and second helical ribbon impellers attached to the stirring shaft, wherein each helical ribbon impeller has stirring blades;
   wherein the first helical ribbon impeller is opposite the second helical ribbon impeller on the stirring shaft and the first and second helical ribbon impellers produce discharge currents towards opposite ends of the stirring vessel from the center of the vessel when the stirring shaft is rotated, and
   wherein the first and second helical ribbon impellers have opposite winding directions, and
   wherein the stirring blades have an outer lengthwise edge and an inner lengthwise edge and the inner lengthwise edge is not in contact with the stirring shaft.

15. The gas/liquid mixing equipment according to claim 14, wherein a ratio of a pitch to a stirring blade diameter in at least one helical ribbon impresser is from 3 to 20.

16. A gas/liquid mixing equipment comprising
   a stirring vessel; a stirring shaft inserted horizontally in the stirring vessel; a helical ribbon impeller attached to the stirring shaft and having stirring blades; wherein the stirring vessel is an autoclave operable at a pressure of 1.85 MPa;
   wherein the ratio (d/D) of the impeller diameter d in the helical ribbon impeller to the diameter D of the stirring vessel is from 0.85 to 0.97 and the ratio (b/D) of the blade width b in each helical ribbon impeller to the diameter D of the stirring vessel is from 0.09 to 0.2, and wherein the stirring blades have an outer lengthwise edge and an inner lengthwise edge and the inner lengthwise edge is not in contact with the stirring shaft.

17. The gas/liquid mixing equipment of claim 16, comprising a first helical ribbon impeller and a second helical impeller, wherein the first helical impeller is opposite the second helical ribbon impeller on the stirring shaft, and the first and second helical ribbon impellers function to effect flow to opposite ends of the stirring vessel from the center of the vessel when the stirring shaft is rotated, and wherein the first and second helical ribbon impellers have opposite winding directions.

18. The gas/liquid mixing equipment of claim 17, wherein the first and the second helical ribbon impellers each have from 2 to 6 stirring blades.

19. The gas/liquid mixing equipment of claim 16, wherein an inclination angle of the stirring blade against a plane perpendicular to the lengthwise direction of the stirring shaft is from 75.3° to 78.2°.

20. The gas/liquid mixing equipment according to claim 16, wherein a ratio of a pitch to a stirring blade diameter in at least one helical ribbon impeller is from 3 to 20.

* * * * *